United States Patent Office 2,865,730
Patented Dec. 23, 1958

2,865,730

METHOD OF REGULATING PLANT GROWTH

Robert L. Gates, Medina, and Kenneth P. Dorschner, Middleport, N. Y., assignors to Food Machinery and Chemical Corporation, San Jose, Calif.

No Drawing. Application July 25, 1955
Serial No. 524,287

5 Claims. (Cl. 71—2.5)

The present invention relates to plant growth regulants and particularly to N-substituted halo-maleimides.

Plant growth regulants or herbicides comprise chemical compounds which affect the normal growth of a plant and may induce stimulation of growth (hormone action), abscission of leaves (defoliant action) or decrease of normal life span and rapid sering of foliage or stem, or both (desiccant action).

The present invention provides a family of plant growth regulants which possess excellent herbicidal action when used as a pre-emergent herbicide or as a post-emergent herbicide, and which operate effectively as defoliants and desiccants.

This class of chemical compounds comprises the N-substituted halomaleimides containing at least one halogen atom in the maleyl group and possessing the class formula:

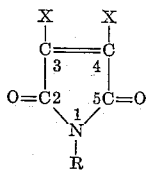

where X is selected from the group consisting of hydrogen and a halogen and at least one X is a halogen and wherein R is an alkyl, aryl, or alicyclic group of 1 to 16 carbons, either saturated or unsaturated, and either substituted or unsubstituted. The group R may contain substituents which may be halogen, hydroxyl, alkyl, alkoxyl, aryl, aroxyl, carboxyl, carbalkoxyl, carbaroxyl, acyloxyl, or amido. There is at least one halogen in the maleyl portion of the imide ring at position 3 or 4, or both, and and if a dihalo compound, X may be the same or differing halogens.

These chemical compounds may be readily prepared by direct reaction of a halomaleic acid, or compound forming such acid in aqueous solution, and the selected amine or substituted amine. The reaction occurs with salts of the amine, such as mineral acid salts, or salts with the lower aliphatic carboxylic acids, e. g., acetic acid. The reaction may be of direct fusion or by effecting the reaction in a nonpolar organic solvent forming an azeotrope with water. This procedure is more fully described in an application of Kaldon, Gates, and Williams, filed March 23, 1955, under Serial Number 496,328.

This class of chemical compounds, therefore, includes the following, among others: N-methylchloromaleimide, N-ethyldibromomaleimide, N - (n-propyl) iodomaleimide, N-(2-ethylhexyl)dichloromaleimide, N-cyclohexyldichloromaleimide, N-alkyldifluoro-maleimide, N-(n-amyl)dibromomaleimide, N-decyldichloromaleimide, N-(2,3-dibromopropyl)dichloromaleimide, N - octyldiiodomaleimide, N-(2-methoxyethyl)dichloromaleimide, N-phenyldichloromaleimide, N - (3 - chlorophenyl)dichloromaleimide, N-(2,4-dichlorophenyl)dichloromaleimide, N-(2-naphthyl) - dichloromaleimide, N - phenyldibromomaleimide, p-phenylenebisdichloromaleimide, N-(4-carboxyphenyl)dichloromaleimide, N - (4 - nitrophenyl)dichloromaleimide, N-(3-chloro - 6 - methylphenyl)dichloromaleimide, N-(3-nitrophenyl)dichloromaleimide, N-cyclohexyldibromomaleimide, N-(4-hydroxyphenyl)dichloromaleimide, N-(3-hydroxyphenyl)dichloromaleimide, N-(3-ethoxyphenyl)dichloromaleimide, N-(4-bromophenyl)dichloromaleimide, N - phenyldibromomaleimide, N - phenylchloromaleimide, N - 2 - phenylethyldichloromaleimide, N-1-naphthyldichloromaleimide, N-2-naphthyldichloromaleimide, N-octyldichloromaleimide, N-decyldichloromaleimide, N-dodecyl-dichloromaleimide, N-tetradecyldichloromaleimide, N-hexyldichloromaleimide, N-ethylchloromaleimide, N-allyldichloromaleimide, N-(2-carboxyethyl)dichloromaleimide, N - (acetylaminoethyl) dichloromaleimide, N-(2-chloro-4-nitrophenyl)dichloro - maleimide, N-(2,4,6-trichlorophenyl)dichloromaleimide, N-(2,4-dimethylphenyl)dichloromaleimide, N - (2,5 - dimethylphenyl - dichloromaleimide, N - (3,5 - dimethylphenyl)dichloromaleimide, N-xylydichloromaleimide, N-2-methoxyethyldichloromaleimide, N - 2 - propyldichloromaleimide, N-isopropyldichloromaleimide, N-isoamyldichloromaleimide, N-(2-hydroxyethyl)dichloromaleimide, N-(2-hydroxypropyl)dichloromaleimide, N-allyldichloromaleimide, N-benzyldichloromaleimide, N-(2-methylphenyl)dichloromaleimide and N-(3-methylphenyl)dichloromaleimide.

In effecting plant growth regulation, the N-substituted halomaleimide is normally applied to the area of plant to be regulated generally as a spray of the active ingredient dispersed in a liquid. The dispersing medium may be water, an organic solvent, mixture of water and organic solvent, hydrocarbon oil or emulsion of hydrocarbon oil with water, preferably a hydrocarbon oil. The application rate of the active ingredient is dictated by the herbicidal effect desired and the species of plant to be acted upon.

The application rate needed to obtain a complete kill will thus be much greater than that required to obtain merely a hormone or stimulant effect. In general, the application rate will be from about ½ pound to 30 pounds per acre. Furthermore the application rate will vary, depending upon whether a preemergent herbicidal action is desired or whether the action is a post-emergent one in the case of the usual weeds.

To determine the overall weed killing effect, greenhouse flats were planted with ten plant species selected from eight different botanical families. The flats were sprayed with a solution of the specified herbicide carried in an acetone-water solution and the stand of plants, after three weeks, compared with that of a similar growth of plants in an untreated flat. The following results were obtained:

Table 1

| Chemical | Average Percent Kill | |
|---|---|---|
| | 16-lb. Acre | 2-lb. Acre |
| N-ethylchloromaleimide | 37 | 6 |
| N-ethyldichloromaleimide | 37 | 15 |
| N-allyldichloromaleimide | 23 | 1 |
| N-(n-butyl) dichloromaleimide | 39 | 16 |
| N-decyldichloromaleimide | 22 | 16 |

To test the pre-emergent herbicidal effect of the N-substituted halomaleimides, the chemical was sprayed at an application rate of 16 pounds per acre upon greenhouse flats planted with ten plant species selected from eight botanical families. The active chemical was dispersed in an acetone-water solution. The stand of plants in the test flats was compared to the stand in a similarly planted untreated flat with the following results:

Table 2

| Chemical: | Average percent kill |
|---|---|
| N-methyldichloromaleimide | 26 |
| N-ethyldichloromaleimide | 43 |
| N-(n-propyl) dichloromaleimide | 17 |
| N-(2,3-dibromopropyl) dichloromaleimide | 16 |
| N-(2-ethylhexyl) dichloromaleimide | 17 |
| N-cyclohexyldichloromaleimide | 12 |
| N-(p-methylphenyl) dichloromaleimide | 26 |
| N-(p-bromophenyl) dichloromaleimide | 40 |
| N-(p-chlorophenyl) dichloromaleimide | 37 |

As the N-alkylhalomaleimide appeared to posses considerable value as post-emergent herbicides, a large cross-section of species of active chemical was selected from the class and were sprayed upon test flats containing three week old plants. The application rate was six pounds per acre, carried in an acetone-water solution. Two weeks after application of the spray the stand in the test flats were compared with similarly planted untreated flats with the following results:

Table 3

| Chemical: | Average percent kill |
|---|---|
| N-(n-butyl) dichloromaleimide | 40 |
| N-(isobutyl) dichloromaleimide | 27 |
| N-(n-amyl) dichloromaleimide | 68 |
| N-methyldichloromaleimide | 57 |
| N-ethyldichloromaleimide | 60 |
| N-(2-hydroxyethyl) dichloromaleimide | 56 |
| N-(2-methoxyethyl) dichloromaleimide | 66 |
| N-isopropyldichloromaleimide | 57 |
| N-n-propyldichloromaleimide | 66 |
| N-allyldichloromaleimide | 67 |
| N-(2,3-dibromopropyl) dichloromaleimide | 36 |
| N-isoamyldichloromaleimide | 58 |
| N-hexyldichloromaleimide | 90 |
| N-(2-ethylhexyl) dichloromaleimide | 65 |
| N-heptyldichloromaleimide | 87 |
| N-octyldichloromaleimide | 42 |
| N-decyldichloromaleimide | 76 |

The extremely powerful dessicant action is illustrated below where N-ethyldichloromaleimide and N(n-amyl) dichloromaleimide dissolved in a refined paraffin oil (deobase) were applied at three application rates, namely one-third pound per acre, one pound per acre and three pounds per acre to ten species of plants selected from eight botanical families. None survived except beans and some grasses at one-third pound per acre. At one pound per acre, some of the beans survived and at three pounds per acre, all plants were killed.

N-dodecyldichloromaleimide in acetone-water solution was sprayed on lima bean plants at an application rate of six pounds per acre when the plants were three weeks old. Forty-eight hours after application, the lima beans were completely defoliated by rupture at the abscission layer.

Although the class of chemicals described herein possess herbicidal activity as a post-emergent herbicide, the activity upon certain plants appears to increase with the size of the alkyl group attached to the imide nitrogen. The following results show this phenomonon and indicate that the herbicidal activity may fall off after the alkyl group reaches an optimum value.

In the following tests the specified plants were treated with the specified alkyl maleimide at an application rate of six pounds per acre with the illustrated percent kill.

Table 4

| Plant Species | N-ethyl | N-amyl | N-hexyl | N-heptyl |
|---|---|---|---|---|
| Rye Grass | 0 | 25 | 80 | 85 |
| Corn | 0 | 0 | 50 | 50 |
| Lima Beans | 0 | 50 | 70 | 50 |
| Oats | 0 | 0 | 100 | 70 |
| Cotton | 100 | 100 | 100 | 100 |
| Flax | 100 | 100 | 100 | 100 |
| Carrot | 100 | 100 | 100 | 100 |
| Lettuce | 100 | 90 | 90 | 100 |
| Mustard | 100 | 100 | 100 | 100 |
| Pigweed | 100 | 100 | 100 | 100 |

Greenhouse flats were prepared by planting viable Johnson grass rhizomes (*Sorghum halepense*) in fumigated sandy loam soil. The flats were watered daily and the planted rhizomes were allowed to produce aerial shoots. After the majority of shoots had developed, all growth was clipped to ground level so as to afford a uniform stand. Shoot regrowth was allowed to progress to a height of approximately 8 inches, at which time one-half of the flats were clipped; simulating a mowing practice.

N-ethyldichloromaleimide and N-hexyldichloromaleimide were applied to clipped and unclipped flats at rates equivalent to 4.0, 1.0, and 0.25 pounds per acre in a hydrocarbon oil (deobase) carrier equal to 100 gallons per acre. 2,2-dichloropropionic acid, sodium salt and trichloroacetic acid sodium salt treatments were included as secondary standards. The results obtained are recorded as Table 5:

Table 5

| Chemical | Application Rate | Percent Control of Johnson Grass | |
|---|---|---|---|
| | | Clipped | Unclipped |
| N-ethyldichloromaleimide | 4.0#/a. | 100 | 100 |
| Do | 1.0#/a. | 100 | 100 |
| Do | 0.25#/a. | 100 | 50 |
| N-hexyldichloromaleimide | 4.0#/a. | 95 | 100 |
| Do | 1.0#/a. | 95 | 100 |
| Do | 0.25#/a. | 95 | 70 |
| Untreated controls | | 0 | 0 |
| 2,2-dichloropropionic acid Sodium salt | 4.0#/a. | 60 | 60 |
| Do | 1.0#/a. | 0 | 0 |
| Do | 0.25#/a. | 0 | 0 |
| Trichloro acetic acid Sodium salt | 4.0#/a. | 0 | 0 |
| Do | 1.0#/a. | 0 | 0 |
| Do | 0.25#/a. | 0 | 0 |

What is claimed is:

1. The method of regulating the growth of plants which comprises applying to the area where plant growth regulation is desired an N-substituted halomaleimide of the class formula

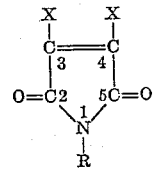

wherein X is selected from the group consisting of hydrogen and a halogen and at least one of said X's is a halogen, and R is selected from the class of radicals consisting of alkyl, aryl and alicyclic radicals, said application being at the rate of from about 0.5 pound to 30 pounds per acre.

2. The method of regulating the growth of plants which comprises applying to the area where plant growth regulation is desired N-ethyldichloromaleimide, said application being at the rate of from about 0.5 pound to 30 pounds per acre.

3. The method of regulating the growth of plants which comprises applying to the area where plant growth regulation is desired N-dodecyldichloromaleimide, said application being at the rate of from about 0.5 pound to 30 pounds per acre.

4. The method of regulating the growth of plants which comprises applying to the area where plant growth regulation is desired N-amyldichloromaleimide, said application being at the rate of from about 0.5 pound to 30 pounds per acre.

5. The method of regulating the growth of plants which comprises applying to the area where plant growth regulation is desired N-decyldichloromaleimide, said application being at the rate of from about 0.5 pound to 30 pounds per acre.

References Cited in the file of this patent

UNITED STATES PATENTS

| | | |
|---|---|---|
| 2,205,558 | Flett | June 25, 1940 |
| 2,547,496 | Rowland | Apr. 3, 1951 |

OTHER REFERENCES

Altschul et al. in "Chemical Abstracts," vol. 41, col. 1287a (1947).

Dedication 2,865,730.—*Robrt L. Gates*, Medina, and *Kenneth P. Dorschner*, Middleport, N.Y. METHOD OF REGULATING PLANT GROWTH. Patent dated Dec. 23, 1958. Dedication filed Nov. 4, 1971, by the assignee, *Food Machinery and Chemical Corporation*.

Hereby dedicates to the Public the remaining term of this patent.

[*Official Gazette December 26, 1972.*]